Patented May 12, 1942

2,282,815

UNITED STATES PATENT OFFICE 2,282,815

STABILIZATION OF OILS

Sidney Musher, New York, N. Y., assignor to Musher Foundation Incorporated, New York, N. Y., a corporation of New York No Drawing. Original application July 31, 1940, Serial No. 348,827. Divided and this application February 25, 1942, Serial No. 432,265

9 Claims. (Cl. 260—398.5)

The present invention relates to the stabilization of glyceride oils and particularly to the stabilization against oxidative deterioration of those glyceride oils which contain a large proportion of unsaturated glycerides.

It has been found that these oils are particularly oxidizable and that this deterioration is increased wherever the oils are subjected to high temperature deodorization during the refining process.

It has now been found that when such glyceride oils are heated to relatively high temperatures with combinations of organic, preferably aliphatic, non-aromatic nitrogen compounds such as the proteins including casein and gelatin, zein, the proteoses, albumins, globulins and the amino acids such as glutamic acid, glycine, aspartic acid, alanine or tyrosine on the one hand and a water soluble carbohydrate or sugar such as dextrose or a phosphorus compound such as a phosphatide including lecithin and cephalin or phosphoric acid or its salts on the other hand, instead of losing stability and becoming more subject to deterioration, the oils will become very stable and highly resistant to oxidative deterioration and rancidity.

The sugars and the organic nitrogen compounds or the phosphatides and the organic nitrogen compounds are used preferably in equal proportions. They may also be employed in relative proportions varying from about 1 part of the sugar or phosphatide and 10 parts of the organic nitrogen compound to 10 parts of the sugar or phosphatide and 1 part of the organic nitrogen compound and the combinations are dispersed in the glyceride oil which is then heated or they may be added to the oil during high heat treatment to develop marked antioxygenic effectiveness.

These combinations of the organic nitrogen compounds with either the sugars or phosphorus compounds may be added separately to the oil to be stabilized or may first be mixed in combination and then added to the oil but in either case they are thoroughly dispersed in the oil and held dispersed in the oil while the oil is at an elevated temperature in excess of 250° F. and preferably at over 400°.

The sugars which are preferably utilized for combination with the proteins or amino acids include particularly the monosaccharides such as dextrose and less preferably the di, tri or polysaccharides such as sucrose, maltose, lactose and still less preferably dextrin or solubilized and/or gelatinized starch.

Other sugars that may be utilized for combination with the organic nitrogen compounds include raw or refined cane or beet sugar, cane or beet sugar molasses, invert sugar or molasses, corn sugar molasses, carbohydrate alcohols, etc.

The preferred combinations for addition to oils followed by heating are mixtures of approximately equal parts of the proteins such as casein or gelatin with the monosaccharides such as dextrose.

The phosphorus compounds employed for combination with the protein or amino acid include phosphoric acid and particularly the phosphatides such as lecithin or cephalin.

The lecithin may be obtained from any source but is preferably obtained from crude soya bean, corn or cottonseed oil by precipitation of the lecithin after expulsion or extraction of the oil from the soya beans, corn germs or cottonseed. The lecithin may be in its crude form or in substantially refined form when utilized for combination with the protein and for dispersal in the oil at the elevated temperature to produce the stabilizing effect.

Instead of using the phosphorus compound such as the lecithin in substantially purified condition, it is also possible to use animal or vegetable materials which are high in phosphatide content and which contain 30% to 40% or more total phosphatide content against their solids weight, such as, for example, nerve tissue and brain tissue.

The combination is added in an amount of less than 5% and desirably less than 1%. As little as 0.02% to 0.5% will give highly desirable stabilizing results when the glyceride oils are treated in accordance with this invention.

After dispersing the combination of the organic nitrogen compound with the phosphatide or sugar in the oil, the oil is heated to an elevated temperature, desirably in excess of 250° F. and preferably to between 325° F. and 450° F. for at least 15 to 30 seconds.

It has been found that merely melting a glyceride fat or oil, particularly where the glyceride is solid at room temperature, is not sufficient to give the desired effect and it is necessary to utilize an elevated temperature substantially above the melting point of the glyceride if it normally be solid at room temperature.

During the heating period, any residue which may become burnt or charred may be removed as by filtration or centrifuging from the body of the oil, as the stabilization of the oil will already have been effected.

This charring apparently enhances the action of the combination on the oil and it has been found particularly desirable for the heating to be sufficiently high so as to produce charring in order to obtain the fully desirable results of the present invention.

The oil which has been heated with the combination will normally be darker as the result of the elevated temperature treatment and the stabilization will have been effected even though the charred residue be removed from the oil as by filtration or centrifuging.

It, however, has been found that the original light color of the oil may be restored by a bleaching process as, for example, with fuller's earth or other decolorizing materials and still retaining a substantial enhancement in the stability of the oil.

The results of the present invention are particularly surprising since antioxidants are recognized as losing at least a portion of, and in most cases a major portion of their effectiveness when heated to elevated temperatures such as to 400° F. or more.

*Example*

Bleached refined lard was treated by adding thereto and mixing therein combinations of organic nitrogen compounds with sugars. The lard containing the combination was then heated to 400° F. for 5 minutes, allowed to cool, and filtered to remove the charred sugar solids. The lard was thereupon tested by bubbling air through a 20 cc. sample of the lard at 125° F. until rancidity as determined organoleptically and by peroxide values was observed. The following results were obtained.

|  | Unheated | After heating to 400° F. for 5 minutes |
|---|---|---|
|  | Hours | Hours |
| Control refined bleached lard (no additions) | 4 | 3 |
| Lard plus 0.1% dextrose alone | 4 | 3½ |
| Lard containing 0.1% dextrose plus— |  |  |
| 0.1% asparagine | 8 | 19 |
| 0.1% casein | 4 | 13 |

Each of the above materials used with dextrose, when heated in the lard without dextrose results generally in a decrease in stability of the lard.

It is not desirable merely to heat the various combinations alone and then to add such heated combinations to an oil in the same manner that other antioxidants may be added without further heating and to obtain the fully enhanced stabilization. In order to obtain the desired interaction the heating should be conducted after dispersal of the combination in the oil.

The glyceride may, where desired, be bleached or otherwise refined after treatment at the elevated temperature with the combination and a distinct enhancement of the antioxygenic effect will be obtained, such enhancement being far in excess of normal expectation.

It is not desirable for the heating to be conducted in a small body of the oil and that oil used as a base for addition to a large body of oil. The most desirable method is for the combination to be dispersed in the entire body of material to be stabilized, followed by subjecting the oil to a high heat in order to produce the desired interaction or result.

Apparently a chemical reaction occurs between the components of the combination and the oil at the elevated temperature whereby the stabilization is effected, as this reaction does not appear to be related to ordinary negative oxidation catalysis by means of which antioxidants normally exercise activity.

The higher the temperature to which the oil containing the combination is subjected, the greater the stabilizing action although the sharpest increase in stabilization is between about 325° F. and 450° F.

The heat treatments need not be prolonged, the enhanced antioxygenic effect being obtained in relatively short periods particularly where the higher temperatures are employed. Normally, the oil containing the combination may merely be heated to the desired temperature and allowed to cool, being held at the high temperature for a period of 10 minutes or more.

The heat treatment will usually be carried out at atmospheric pressure but the use of super or sub-atmospheric pressures may also be employed with satisfactory results.

This process may be utilized in the treatment and stabilization of a wide variety of refined or crude glyceride oils such as the vegetable oils and fats including cottonseed oil, corn oil, peanut oil, linseed oil, soya bean oil, olive oil, etc., the animal oils and fats including lard, tallow, oleo oil, cod liver oil, halibut liver oil, mackerel oil, menhaden oil, herring oil, shark liver oil, butter, etc., the glyceride soap oils and the sulfonated oils.

Not only is the oil stabilized, but components of the oils are also stabilized. For example, the vitamin A content of fish liver and other oils, the carotene content of butter fat and similar substances associated with the oils which may be destroyed or reduced by oxidation are highly stabilized by this treatment.

This invention is, however, particularly beneficial in the treatment of those glycerides which contain large proportions of unsaturated fatty acids, as the combination appears to react more completely with these unsaturated oils at the elevated temperatures.

Although one or more members of the combination may already have some antioxygenic effect when added to the glyceride oils and without the heat treatment, nevertheless such antioxidant power is very greatly increased and enhanced by heating the combination in the oil to over 250° F. and preferably to 325° F. to 450° F.

The stability of the treated oils will often be enhanced from 50% to 500% or more by the heat treatment in the presence of these combinations as compared to the stability which would be obtained by the addition of the combinations without the heat treatment described in this invention.

The most important features of the present invention reside in the fact that the added materials are not normally present in the oil to be stabilized and upon addition are thoroughly dispersed in such oil. The heat treatment is carried out for a sufficient length of time to increase the stability by usually not less than 50% over the stability of the unheated oil.

While the combination is dispersed in the oil at the elevated temperature of, say 400° F., superheated steam may, where desired, be continuously injected into the oil over a period as long as 4 to 6 hours and the objectionable flavors and odors originally present in the oil may be removed therefrom while the combination is exerting its enhanced antioxygenic effect.

It has been found particularly desirable for a small amount of the combination to be added to high fat containing animal products, heating at atmospheric or elevated pressures to temperatures of about 250° F. so that the glyceride oil or fat contained therein is released from the meat or fish animal product and a highly stabilized animal glyceride is obtained.

For example, to a kettle of hog fat containing 70% total glycerides may be added 0.1% of a combination of dextrose and casein against the weight of the hog fat and the combination placed in a steam kettle with steam being injected into the kettle to produce about 45 pounds pressure. After a 4 to 5 hour treatment, the pressure may be released and the rendered lard removed. The stability of the lard obtained in this manner will be much greater than if the combination had merely been added to the lard after rendering.

For example, when a small amount of a combination of dextrose and casein is added to hog fat and the hog fat containing the combination is then rendered at a temperature of 275° F. for 4 hours, the rendered lard removed from the rendering kettle has a far greater stability than where a proportionate amount of the combination is added to the lard after rendering and the improvement in stability is even greater than where the combination is added to the lard after rendering and the lard containing the combination is then heated to 275° F. for 4 hours. Apparently a further interaction takes place by adding the combination to the rendering kettle where the rendering is conducted at over 250° F. resulting in a most highly stabilized oil.

In a similar manner, a small amount of the combination may be added to the rendering kettle in the rendering of other meat and fish oils and fats including tallow, menhaden oil, herring oil, etc., or to the cooking kettles in the manufacture of fish meals, particularly high glyceride containing fish meals and where the temperature is at least about 250° F., the desired interaction will result producing enhanced stabilization.

Where the glyceride oils are heated over long periods to temperatures over 250° F. and desirably to temperatures over 300° F., small amounts of the combination may be added to the oils at regular intervals of 5 to 20 hours followed by filtration to remove the insoluble portion before adding a fresh amount of the combination. In this manner, the glycerides will be held in highly stabilized and non-rancid condition over very long periods.

In addition to treating the glyceride oils and fats with these combinations, the essential oils and particularly the oxidizable unsaturated essential and perfume oils such as lemon oil and orange oil may similarly be treated with the combination followed by an elevated temperature treatment to enhance the antioxygenic effect.

The combinations also exert an enhanced antioxygenic effect when added in small proportions to the substantially non-volatile, high molecular weight, hydrocarbon oils and particularly the lubricating oils followed by temperature treatments of over 250° F. and preferably between 350° F. and 500° F.

In carrying out the above described high temperature treatment, it is important that the solids of the combination be uniformly dispersed or distributed throughout the body of the oil in substantially fine particles and that the heating be carried out with substantial exclusion of the atmosphere or without contact with air.

It is moreover desirable for the combination to be maintained in dispersed condition during the heat treatment and so that it will not tend to settle or conglomerate or be present in the form of large lumps or particles since in the latter case the fully desirable results of the present invention are not obtained.

It is desirable that the oil after treatment in accordance with the present invention will not be materially changed in its odor or flavor. The oil will, however, have a darker color which may be removed by subjecting it to a bleaching operation.

It has also been found that desirable results are obtained where the combinations are mixed with the oil or fibrous materials containing the glyceride oil and then the oil is heated to a temperature of, say from 250° F. to 500° F. under a reduced pressure, such as under a gas pressure less than 1 pound per square inch to cause distillation of part or all of the glyceride oil composition and it has been observed that such distilled fraction is highly stable and is also free of the combination which has served as the stabilizing agent at the elevated temperature of distillation.

After treatment of the glyceride oil with the combination at the elevated temperature, the unsaponifiable fraction may be removed as by alcoholic extraction and said unsaponifiable fraction utilized for addition to other oxidizable oils to protect them against oxidative deterioration.

Where caseinogen is utilized, which caseinogen already contains a certain phosphorus content, the caseinogen along may be added to oils, particularly glyceride oils, followed by heating to in excess of 250° F. and an enhanced antioxygenic effect is obtained.

In the use of the phosphoproteins, lecithoproteins or nucleoproteins in accordance with the present invention, where those materials are added to oils and particularly glyceride oils and the oils then heated to at least 250° F., an enhanced antioxygenic effect is also obtained.

The present application is a division of application Serial No. 348,827, filed July 31, 1940, and through said application is a continuation in part of application Serial No. 247,631, filed December 24, 1938.

Through the latter application Serial No. 247,631, the present application continues in part the subject matter of the applications which matured into Patents 2,198,200, 2,198,208, 2,198,210, 2,198,211 and 2,198,215.

Having described my invention, what I claim is:

1. A process of stabilizing oils subject to oxidative deterioration, whereby they become less subject to such deterioration, which comprises adding thereto and dispersing therein a small amount of a combination of a material selected from the group consisting of the phosphatides, phosphoric acid and the salts of phosphoric acid and an organic nitrogen compound selected from the group consisting of the proteins and amino acids, and heating to in excess of 250° F.

2. A process of stabilizing oils subject to oxidative deterioration, whereby they become less subject to such deterioration, which comprises adding thereto and dispersing therein a small amount of a combination of a phosphatide and a protein, and heating to in excess of 250° F. while the oil is under sub-atmospheric pressure.

3. A process of stabilizing glyceride oils subject to oxidative deterioration whereby they become less subject to such deterioration, which comprises adding thereto and dispersing therein a small amount of a combination of a phosphatide and casein, and heating to in excess of 250° F.

4. A process of stabilizing oils subject to oxidative deterioration whereby they become less subject to such deterioration, which comprises adding thereto and dispersing therein a small amount of a combination of a phosphatide and an amino acid, and heating to in excess of 250° F.

5. A process of stabilizing oils subject to oxidative deterioration whereby they become less subject to such deterioration, which comprises adding thereto and dispersing therein a small amount of a combination of a phosphatide and tyrosine, and heating to in excess of 250° F.

6. An oil normally subject to oxidative deterioration carrying the reaction product of a combination of a material selected from the group consisting of the phosphatides, phosphoric acid and the salts of phosphoric acid and an organic nitrogen compound selected from the group consisting of the proteins and amino acids in the oil, said reaction product having been formed by heating the combination in the oil to in excess of 250° F. whereby an enhanced antioxygenic effect is obtained.

7. A glyceride oil having a high proportion of unsaturated glycerides, said oil being normally subject to oxidative deterioration, said oil carrying the reaction product of a combination of a phosphatide and an organic nitrogen compound selected from the group consisting of the proteins and amino acids, said reaction product having been formed by heating the combination in the oil to in excess of 250° F. whereby an enhanced antioxygenic effect is obtained.

8. A glyceride oil normally subject to oxidative deterioration carrying the reaction product of a combination of a phosphatide and a protein, said reaction product having been formed by heating the combination in the oil to a temperature in excess of 250° F. whereby an enhanced antioxygenic effect is obtained.

9. A process of stabilizing glyceride oils subject to oxidative deterioration, whereby they become less subject to such deterioration, which comprises adding thereto and dispersing therein a small amount of a combination of a material selected from the group consisting of the phosphatides, phosphoric acid and the salts of phosphoric acid and an organic nitrogen compound selected from the group consisting of the proteins and amino acids, heating to in excess of 250° F. and removing the unsaponifiable fraction therefrom.

SIDNEY MUSHER.